May 17, 1960 R. R. DAHL ET AL 2,936,790
NOISE REDUCING FLOW CONTROL DEVICE
Filed Dec. 27, 1955 2 Sheets-Sheet 1

Inventors
ROBERT R. DAHL
HOWARD L. ERICKSON

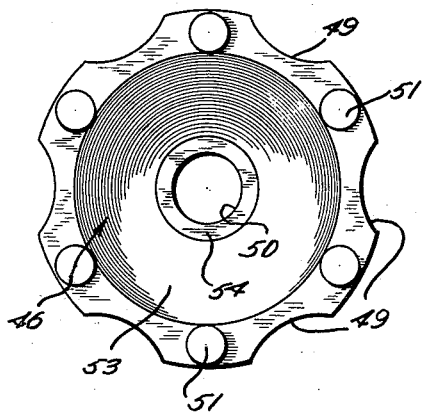
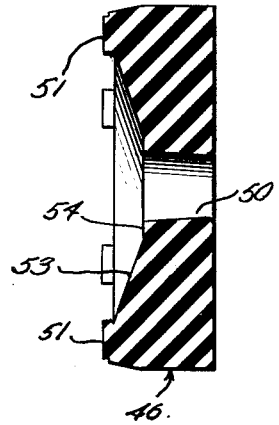
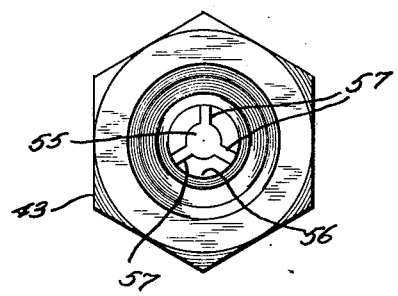
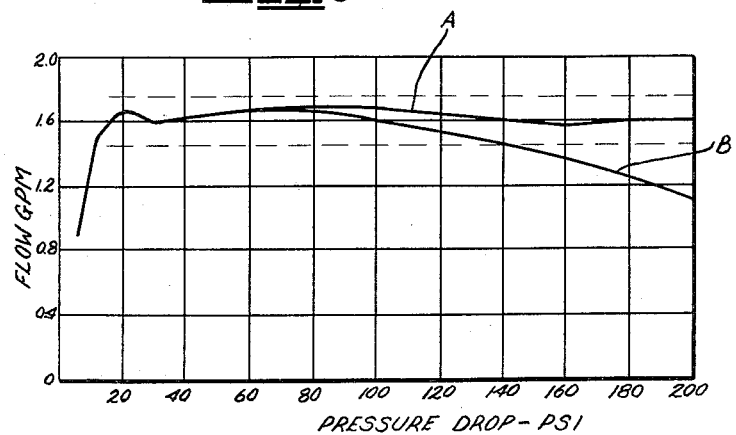

United States Patent Office 2,936,790
Patented May 17, 1960

2,936,790
NOISE REDUCING FLOW CONTROL DEVICE

Robert R. Dahl and Howard L. Erickson, Chicago, Ill., assignors to The Dole Valve Company, Chicago, Ill., a corporation of Illinois Application December 27, 1955, Serial No. 555,419

7 Claims. (Cl. 138—46)

This invention relates to improvements in flow control devices and more particularly relates to such devices as provide a uniform delivery volume of fluid under pressure, and so arranged as to reduce the noise usually created in such devices.

A principal object of the present invention is to provide a flow control device so arranged as to eliminate the objectionable part of the noise inherently produced by devices of this type.

Still another object of the invention is to provide an improved form of flow control device having a noise reducer capable of spreading the high velocity stream associated therewith to reduce the objectionable noise created by the flow control and cooperating with the flow control to control the flow of fluid passing through the device.

A further object of the invention is to provide an improved flow control device in which a resilient annulus having a flow control orifice therein reacts against a seat to reduce the cross-sectional area of the orifice upon increases in pressure and in which a noise reducing flow diverter cooperates with the flow control orifice and provides flow control for fluid passing through the orifice at high pressure drops.

A still further object of the invention is to provide an improved method and apparatus for reducing the noise produced by a high velocity stream as it passes through a flow control orifice.

A still further object of the invention is to provide a novel and improved form of shut-off valve arranged to deliver a uniform volume of fluid regardless of variations in pressure of the fluid at the source, and having a flow diverter in cooperation with the orifice through a uniform delivery volume flow control device for spreading the stream passing through the device and thus reducing the objectionable noise usually created by such devices, and also cooperating with the flow control device to serve as a flow control during conditions of high pressure drop of the fluid passing through the valve.

These and other objects of the invention will appear from time to time as the following specification proceeds and with reference to the accompanying drawings wherein:

Figure 2 is a plan view of the flow control annulus shown in Figure 1;

Figure 3 is an enlarged cross-sectional view taken through the flow control device;

Figure 4 is an end view of the fitting and noise reducing flow diverter and showing certain details of the flow diverter not shown in Figure 1; and Figure 5 is a graph showing comparative flow characteristics through the valve of Figure 1 with and without the noise reducer of the present invention.

Figure 1:
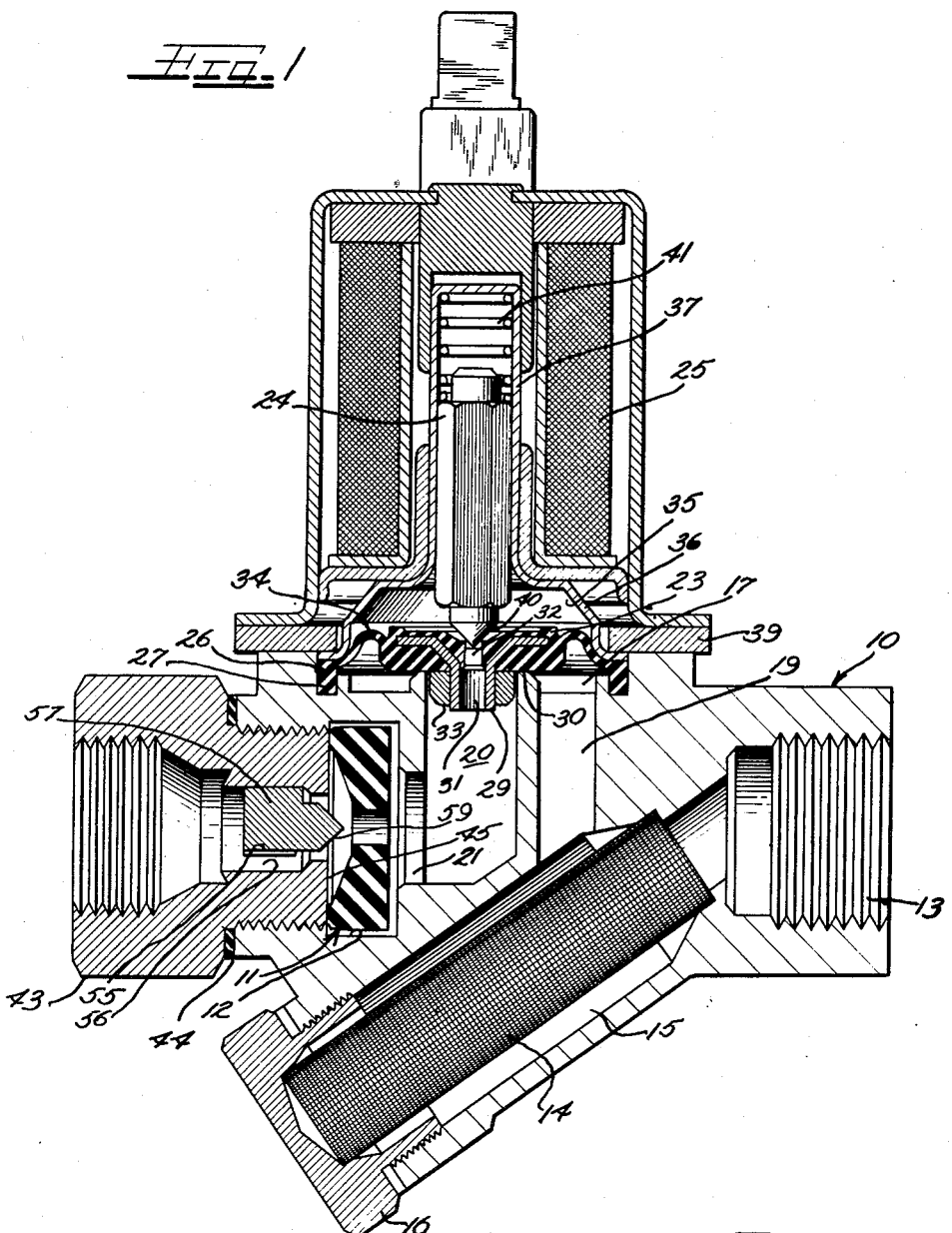
Figure 1 is a cross-sectional view taken through a pressure operated solenoid control valve constructed in accordance with the invention and showing a flow control device and diverter constructed in accordance with the invention associated therewith.

In the embodiment of our invention illustrated in the drawing we have shown in Figure 1 a section through a shut-off valve 10. The valve 10 may be a pressure operated solenoid controlled type of valve having a flow control and noise reducer 11 constructed in accordance with our invention in association with an outlet 12 from the valve.

The valve 10 is shown as having an inlet 13 leading into the valve body and communicating with a filtering screen 14 in a filtering chamber 15. The filtering screen 14 is detachably retained within the filtering chamber 15 as by an end cap 16 which may be threaded within said chamber. The chamber 15 has communication with an annular passageway 17, opening to the outside of the body of the valve, through a flow passage 19, supplying fluid for discharge through a port 20 under the control of a diaphragm valve 23. The port 20 is in communication with the outlet 12, through a passageway 21 of reduced cross-sectional area from the cross-sectional area of said outlet, and extending at right angles to the port 20.

The diaphragm valve 23 may be of a well known form of fluid pressure operated valve operated under the control of an armature 24 of an electromagnet 25. The diaphragm valve 23 is preferably formed from rubber, an elastomer or like resilient material and has a flange 26 extending along its outer edge fitting within an annular groove 27 formed in an outer face of the valve body. The diaphragm valve also has a thickened central portion having an insert 29 molded therein. The inner face of said thickened central portion is engageable with an annular seat 30 extending around the port opening 20 to block the flow of fluid through said port opening. The insert 29 has a central passageway 31 leading therethrough communicating with a passageway 32 leading through the diaphragm valve.

A grommet 33 is shown as being fitted on the projecting inner end portion of the insert 29 and extending within the port opening 20 when the valve is closed. The grommet 33 has a relatively close fit with the port opening 20 to provide a throttling action on the flow of water during the valve closing movement by pressure on the outside of the valve.

The diaphragm valve 23 is also provided with a bleeder passageway 34 outwardly of the thickened portion thereof and leading into a diaphragm chamber 35 formed between the outer side of the diaphragm valve 14 and the inside of an end closure cap 36. The end closure cap 36 has a central integrally formed guide 37 extending therefrom and forming a guide for the armature 24. The end closure cap 36 is shown as abutting the outer peripheral portion of the diaphragm valve 23 and as being retained thereto by an annular retainer 39 secured to the valve body as by a suitable securing means (not shown).

The armature 24 has an integrally formed conical valve 40 at its lower end, engageable with the outer end of the passageway 32 through the thickened portion of the valve to block the passage of fluid through said passageway and effect closing of the valve by the pressure of fluid passing through the bleeder passageway 34. A spring 41 is provided to bias the armature 24 and the valve 40 toward the diaphragm valve 23 into engagement with the passageway 32.

Upon energization of the solenoid 25, the valve 40 will move out of engagement with the passageway 32 and relieve pressure within the diaphragm chamber 35. Pressure on the inner or under side of the diaphragm valve 23 will thus move the valve into an open position out of engagement with the seat 30, to accommodate the flow of fluid through the port opening 20 through the outlet 12 from the valve body and the flow control and diverter 11.

Referring now in particular to the flow control and diverter and the association thereof with the diaphragm valve 23, the outlet 12 is shown as having a fitting 43 threaded therein and sealed to the end of the valve body through which said outlet passes, as by an annular seal 44. The fitting 43 has a flat inner face 45 forming a shoulder or seat for a flow control annulus 46 retained in the outlet 12 by the fitting 43.

The flow control annulus 46 has a central orifice 50, deformable upon pressure variations and may be made from rubber, a suitable rubber compound or an elastomer and the like, so as to readily flex in a downstream direction into engagement with the shoulder or seat 45 upon increases in the pressure of fluid acting on the flow control annulus, under the general principles shown and described in Kempton Patent No. 2,454,929 which issued on November 30, 1948.

The flow control annulus 46 is shown in Figure 2 as being a by-pass flow control having a plurality of spaced grooves extending axially along the periphery thereof and forming by-pass passageways 49, by-passing the central orifice 50 of the flow control under low pressure conditions to provide a relatively free flow of fluid under such conditions through said by-pass passageways and central orifice.

The flow control annulus 46 has a plurality of lugs 51 projecting from the downstream face thereof between the grooves or by-pass passageways 49 adjacent the periphery of the flow annulus and spacing the downstream face of the flow control from the seat 45 to accommodate the free flow of fluid along the by-pass passageways 49 out through the fitting 43 under low pressure conditions. The downstream face of the flow control annulus 46 has a frusto-conical recessed portion 53 terminating into an annular surface 54 parallel to the face of the seat 45. The portion of the flow control annulus surrounding the recessed portion 53 comes into engagement with the seat 45 adjacent its margin upon flexing of the lugs 51 under increasing pressure conditions and blocks the passage of fluid through the by-pass passageways accommodating the control of the flow through the outlet by bending of the flow control under pressure and reduction of the cross-sectional area of the orifice 50.

The orifice 50 leading through the flow annulus is shown as tapering outwardly from the upstream to the downstream face thereof at a relatively flat angle which may be from two to six degrees as in our application Serial No. 558,088, filed January 9, 1956, now Patent No. 2,891,578, issued June 23, 1959, to decrease the time required for the flow control device to come to its rated flow under low pressure conditions and to increase the uniformity of flow where the pressure may drop off.

As the water, or other liquid flowing through the valve passes from the relatively large area provided in the port opening 20 and passageway 21 at right angles thereto through the restriction provided by the orifice 50 under relatively high pressure conditions, a large portion of the static head originally possessed by the stream is transferred into kinetic energy, so that a relatively high velocity jet stream issues from the discharge end of the flow control annulus 46.

If this stream were permitted to pass directly into the inlet end of the fitting 43 it would very likely create an objectionable, high pitched noise or whistle. To overcome this tendency, a flow diverter 55 is provided in a reduced diameter passageway 56 of the fitting 43. In the particular form of the invention illustrated in the drawings, the flow diverter 55 is in the form of a spider having three radially extending arms 57 extending within the reduced diameter passageway 56 and fitted therein with a close fit which may be a press fit, with the spaces between said arms providing flow passageways for fluid passing through the outlet end of the fitting 43. Extending from the arms 57 in an upstream direction toward the orifice 50 and in axial alignment therewith is a conical flow diverting head 59 extending beyond the face of the seat 45 in an upstream direction a distance sufficient to cooperate with the orifice 50 through the flow annulus 46 and present a surface cooperable with the flow annulus, toward which the flow annulus moves under pressure, to provide a flow control in addition to that afforded by restriction of the annulus at high pressure drops.

Liquid passing through the passageway 21 and coming into engagement with the flow control annulus 46 will flow through the central orifice 50 of said flow control annulus as well as along the by-pass passageways 49 thereof under low pressure conditions. As, however, the pressure on the upstream face of flow annulus increases, the annulus will be forced into engagement with the seat 45 along the outer margin of the recessed portion 53. This will block the flow of fluid through the by-pass passages 49, the control of the flow of fluid being effected solely by deformation of the orifice 50 throughout a part of the pressure range, and by movement of the orifice 50 toward the flow diverter 55, where the pressure drop increases sufficiently to flex the flow control annulus into cooperation with the conical flow diverter head 59.

As fluid under pressure engages the flow diverter head 55, said head will spread the flow laterally and in doing so will spread the stream passing through the restricted orifice 50 and reduce the noise level without appreciably increasing the pressure drop across the flow control system.

In Figure 5 we have shown comparative flow curves of a valve flow control device and flow diverter or noise reducer constructed in accordance with the present invention and a valve having same flow control without the noise diverter. In this figure the solid line A represents the actual curve of the flow in gallons per minute throughout a pressure drop range up to 200 pounds per square inch across the valve while the line B represents the actual curve of the flow through the valve without the noise diverter. The straight dashed lines indicate the acceptable flow limits in the design of the valve. It may be seen in curve A of this figure that the flow through the valve comes up to its lower flow limit at a pressure drop of substantially 10 p.s.i. and that the flow is relative uniform from 20 p.s.i. up to 200 p.s.i. and that in curve B the flow commences to drop off at substantially 80 p.s.i. Thus in curve A the uniformity in the flow increases as the pressure drop increases, thus indicating the advantages of the cooperation of the by-pass flow annulus with the diverter or noise reducer head 59 under high pressure conditions in which the head serves as a noise reducer as well as a flow control, particularly in the range of from 140 to 200 p.s.i.

While we have herein shown and described one form in which our invention may be embodied, it will be evident that various modifications and variations may be made to the described embodiment without departing from the spirit and scope of the novel concepts of the present invention.

We claim as our invention:

1. A flow control system comprising a housing, a resilient annular flow control member in said housing providing an orifice therein, and flow spreader means positioned downstream from and in close proximity to the discharge end of said orifice, said flow spreader means being shaped to provide a confined flow path for the liquid leaving said orifice of a cross-sectional area greater than the cross-sectional area at the discharge end of said orifice, but providing no abrupt area changes for the liquid stream, whereby a portion of the kinetic energy of the stream leaving said orifice is gradually dissipated along said flow spreader.

2. A flow control device for liquids comprising a conduit having an inner wall of a relatively large diameter adapted to be connected to a source of liquid under pressure, a resilient annular flow control member in said conduit for effecting a substantially uniform rate of flow therethrough under varying liquid pressures at said source, said flow control member having a central orifice of smaller diameter than the inside diameter of said conduit, and flow spreader means in said conduit adjacent said flow control member on the downstream side thereof for diverting liquid flowing through the orifice of said flow control member outwardly toward the inside wall of said conduit.

3. In a flow control device for providing a substantially constant rate of flow under varying pressures, a housing having a passageway therethrough, an annular seat in said passageway, a flexible resilient flow control member loosely mounted in said housing and engageable with said seat and having a central orifice therethrough deformable upon flexing of said flow control member under variations in pressure to provide a substantially constant rate of flow, said flow control member by itself being operable in a normal pressure range to maintain said substantially constant rate of flow under increases in pressure solely by restriction of said orifice, and a noise reducing flow diverter fixedly mounted in said housing on the downstream side of said flow control member concentrically of and entirely within said passageway in substantial axial alignment with said orifice for reducing noise by changing the pattern of fluid flow from a solid stream of fluid flowing through said orifice to a substantially annular stream of fluid flowing all the way past said flow diverter axially thereof and back to a solid stream of fluid flowing in the same direction as the direction of flow through said orifice, said flow diverter extending upstream of said seat and having a generally conical head having an apex spaced downstream of said orifice when said flow control member is in a normal unflexed condition and providing a surface cooperable with said central orifice of said flow control member at higher pressures to maintain said substantially constant rate of flow at pressures higher than said normal pressure range at which said flow control member is inherently able to maintain said substantially constant rate of flow by itself.

4. In a flow control device for providing a substantially constant rate of flow under varying pressures, a housing having a passageway therethrough, an annular seat in said passageway, a flexible resilient flow control member loosely mounted in said housing and engageable with said seat and having a bypass passageway peripherally thereof and having a downstream face resiliently spaced from said seat permitting flow of fluid through said bypass passageway at low pressures and accommodating blocking of said bypass passageway at intermediate and high pressures by contact of said downstream face of said flow control member with said seat, said flow control member having a central orifice therethrough deformable upon flexing of said flow control member at intermediate pressures to provide a substantially constant rate of flow, and a noise reducing flow diverter fixedly mounted in said housing on the downstream side of said flow control member concentrically of and entirely within said passageway in substantial alignment with said orifice for reducing noise by changing the pattern of fluid flow from a solid stream of fluid flowing all the way through said orifice to a substantially annular stream of fluid flowing past said flow diverter axially thereof and back to a solid stream of fluid flowing in the same direction as the direction of flow through said orifice, said flow diverter having a generally conical head extending upstream of said seat having an apex spaced downstream of said orifice and providing a surface cooperable with said flow control member at high pressures to maintain said substantially constant rate of flow at pressures higher than those at which said flow control member is inherently able to maintain said substantially constant rate of flow by itself.

5. In a flow control device for providing a substantially constant rate of flow under varying pressures, a housing having a passageway therethrough, an annular seat in said passageway, a flexible resilient flow control member loosely mounted in said housing and engageable with said seat and having a bypass passageway peripherally thereof and having a downstream face resiliently spaced from said seat permitting flow of fluid through said bypass passageway at low pressures and accommodating blocking of said bypass passageway at intermediate and high pressures by contact of said downstream face of said flow control member with said seat, said flow control member having a central orifice therethrough deformable upon flexing of said flow control member at intermediate pressures to provide a substantially constant rate of flow, and a noise reducing flow diverter fixedly mounted in said housing on the downstream side of said flow control member and having a conical head concentrically of and entirely within said passageway in substantial alignment with said orifice and also having a plurality of radially extending arms supporting said head in said passageway with the apex of said head facing said orifice, said head reducing noise by changing the pattern of fluid flow from a solid stream of fluid flowing through said orifice to a plurality of arcuate streams of fluid concentric with said solid stream and flowing all the way past said diverter axially thereof, and said passageway beyond said diverter accommodating said arcuate streams to flow back to a solid stream of fluid flowing in the same direction as the direction of flow through said orifice, said flow diverter extending upstream of said seat and the apex thereof being spaced downstream of said orifice to provide a surface cooperable with said flow control member at high pressures to maintain said substantially constant rate of flow at pressures higher than those at which said flow control member is inherently able to maintain said substantially constant rate of flow by itself.

6. In a flow control device for providing a substantially constant rate of flow under varying pressures, a housing having a passageway therethrough, a flat annular seat in said passageway, an annular resilient flow control member loosely mounted in said passageway for cooperation with said seat and having a central flow control orifice leading therethrough, said flow control member having a downstream face having a flat annular rim extending radially inwardly from the peripheral edge thereof for a small portion of the radius of said flow control member and having a frusto-conical recessed portion extending radially outwardly from said central flow control orifice for equal distances in all radial directions to the inner edge of said rim, a plurality of angularly spaced lugs within the edges of said rim, the longest dimensions of which are no wider than the width of said rim, a plurality of by-pass passageways leading from the upstream to the downstream face of said flow control member peripherally of said flow control member and recessed within said flow control member and said rim for a portion of the width of said rim and angularly spaced from said lugs, said lugs being sufficiently short to accommodate said rim to engage said seat upon increasing pressures on said flow control member and shutoff the flow through said by-pass passageways and to thereafter accommodate the maintaining of a substantially constant rate of flow through said central orifice.

7. In a flow control device for providing a substantially constant rate of flow under varying pressures, a housing having a passageway therethrough, an annular seat in said passageway, a flexible resilient flow control member loosely mounted in said housing and engageable with said seat and having a central orifice therethrough deformable upon flexing of said flow control member under variations in pressure to provide a substantially constant rate of flow, said flow control member by itself being operable in a normal pressure range to maintain said substantially constant rate of flow under increases in pressure solely by restriction of said orifice, a noise reducing flow diverter fixedly mounted in said housing on the downstream side of said flow control member concentrically of and entirely within said passageway in substantial alignment with said orifice for reducing noise by changing the pattern of fluid flow from a solid stream of fluid flowing through said orifice to a substantially annular stream of fluid flowing all the way past said diverter axially thereof and back to a solid stream of fluid flowing in the same direction as the direction of flow through said orifice, said diverter extending upstream of said seat to provide a surface cooperable with said flow control member at higher pressures to maintain said substantially constant rate of flow at pressures higher than said normal pressure range at which said flow control member is inherently able to maintain said substantially constant rate of flow by itself, said flow control member having a downstream face having a flat annular rim extending radially inwardly from the peripheral edge thereof for a small portion of the radius of said flow control member and having a frusto-conical recessed portion extending radially outwardly from said central flow control orifice for equal distances in all radial directions to the inner edge of said rim, a plurality of angularly spaced lugs within the edges of said rim, the longest dimensions of which are no wider than the width of said rim, a plurality of by-pass passageways leading from the upstream to the downstream face of said flow control member peripherally of said flow control member and recessed within said flow control member and said rim for a portion of the width of said rim and angularly spaced from said lugs, said lugs being sufficiently short to accommodate said rim to engage said seat upon increasing pressures on said flow control member and shut-off the flow through said by-pass passageways and to thereafter accommodate the maintaining of a substantially constant rate of flow through said central orifice.

References Cited in the file of this patent

UNITED STATES PATENTS

| | | |
|---|---|---|
| 1,709,217 | Hamilton | Apr. 16, 1929 |
| 1,777,522 | Hamilton et al. | Oct. 7, 1930 |
| 1,993,863 | Small et al. | Mar. 12, 1935 |
| 1,993,895 | Ploen | Mar. 12, 1935 |
| 2,684,081 | Chace | July 20, 1954 |
| 2,728,355 | Dahl | Dec. 27, 1955 |
| 2,732,859 | Chace | Jan. 31, 1956 |
| 2,775,984 | Dahl | Jan. 1, 1957 |
| 2,830,621 | Prescott | Apr. 15, 1958 |
| 2,884,009 | Hetherington | Apr. 28, 1959 |